United States Patent
Ranjan et al.

(10) Patent No.: US 11,688,198 B1
(45) Date of Patent: Jun. 27, 2023

(54) SYSTEM USING MULTIMODAL DECORRELATED EMBEDDING MODEL

(71) Applicant: AMAZON TECHNOLOGIES, INC., Seattle, WA (US)

(72) Inventors: Rajeev Ranjan, Seattle, WA (US); Gerard Guy Medioni, Los Angeles, CA (US); Manoj Aggarwal, Seattle, WA (US); Dilip Kumar, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 20 days.

(21) Appl. No.: 17/457,551

(22) Filed: Dec. 3, 2021

(51) Int. Cl.
  G06V 40/13 (2022.01)
  G06V 10/94 (2022.01)
  G06F 18/213 (2023.01)
  G06F 18/214 (2023.01)

(52) U.S. Cl.
  CPC ........ *G06V 40/1318* (2022.01); *G06F 18/213* (2023.01); *G06F 18/2148* (2023.01); *G06V 10/95* (2022.01)

(58) Field of Classification Search
  CPC .. G06V 40/1318; G06V 10/95; G06F 18/213; G06F 18/2148
  See application file for complete search history.

(56) References Cited

U.S. PATENT DOCUMENTS

| | | | |
|---|---|---|---|
| 2021/0073648 A1* | 3/2021 | Lichenstein | G06V 10/762 |
| 2021/0141896 A1* | 5/2021 | Streit | G06V 10/993 |

OTHER PUBLICATIONS

Deng, Jiankang, et al., "ArcFace: Additive Angular Margin Loss for Deep Face Recognigion", The Computer Vision Foundation, 2019, 10 pgs. Retrieved from the Internet: URL: https://openaccess.thecvf.com/content_CVPR_2019/papers/Deng_ArcFace_Additive_Angular_Margin_Loss_for_Deep_Face_Recognition_CVPR_2019_paper.pdf.

Sandler, Mark, et al., "MobileNetV2: Inverted Residuals and Linear Bottlenecks", abstract, arXiv, Mar. 21, 2019, 6 pgs. Retrieved from the Internet: URL: https://arxiv.org/abs/1801.04381.

Sandler, Mark, et al., "MobileNetV2: Inverted Residuals and Linear Bottlenecks", arXiv, Mar. 21, 2019, 14 pgs. Retrieved from the Internet: URL: https://https://arxiv.org/pdf/1801.04381.pdf.

* cited by examiner

*Primary Examiner* — Edward F Urban
*Assistant Examiner* — Wassim Mahrouka
(74) *Attorney, Agent, or Firm* — Lindauer Law, PLLC

(57) ABSTRACT

A biometric identification system uses inputs acquired using different modalities. A model having an intersection branch and an XOR branch is trained to determine an embedding using features present in all modalities (an intersection of modalities), and features that are distinctive to each modality (an XOR of that modality relative to the other modality(s)). During training, a first loss function is used to determine a first loss value with respect to the branches. Probability distributions are determined for the output from the branches, corresponding to the intersection and XORs of each modality. A second loss function uses these probability distributions to determine a second loss value. A total loss function for training the model may be a sum of the first loss and the second loss. Once trained, the model may process query inputs to determine embedding data for comparison with embedding data of a previously enrolled user.

20 Claims, 6 Drawing Sheets

US 11,688,198 B1

SYSTEM USING MULTIMODAL DECORRELATED EMBEDDING MODEL

BACKGROUND

Biometric input data may be used to assert an identity of a user.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features. The figures are not necessarily drawn to scale, and in some figures, the proportions or other aspects may be exaggerated to facilitate comprehension of particular aspects.

Figure 1:
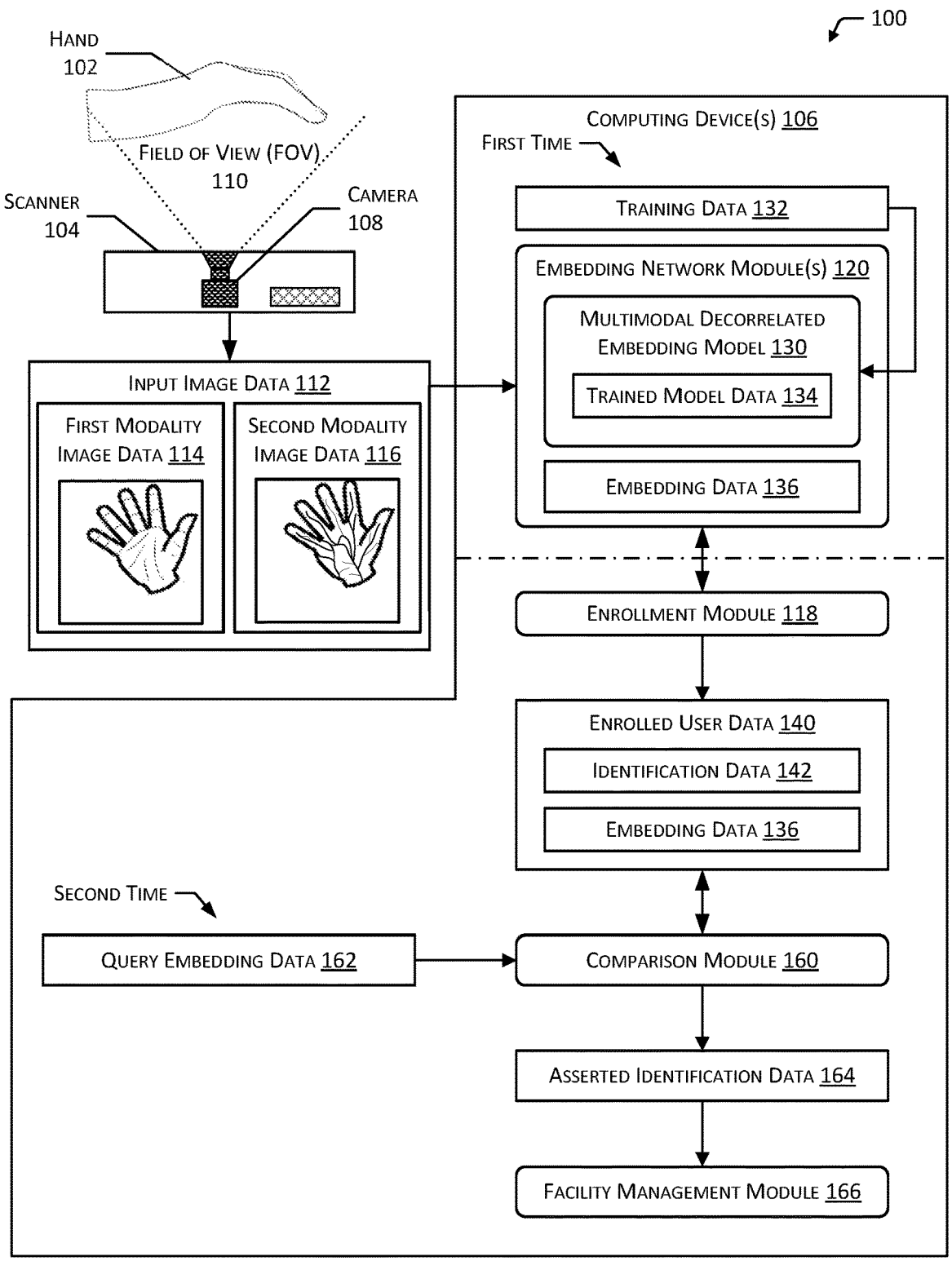
FIG. 1 illustrates a system to train and use a multimodal decorrelated embedding model, such as in a biometric identification system, according to some implementations.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Input data, such as used for biometric identification, may be acquired using one or more modalities. For example, a first modality may comprise images of surface skin of a user's palm while a second modality may comprise images of subcutaneous features such as veins of the user's palm. The use of multi-modality input data provides several advantages for biometric identification. One advantage is the potential for decorrelation between the inputs that may improve overall accuracy. For example, each modality may "see" different features, providing more distinct information that may better distinguish one person from another, determine the presence of an artifact such as a realistic-appearing face mask or fake hand, and so forth.

Traditional biometric identification systems using multi-modalities may utilize multiple embedding models, each comprising a machine learning system that has been trained to accept an input image of a particular modality and provide as output embedding data. This embedding data may comprise a vector that is representative of the features in the input image, as processed by the trained embedding model. For example, a first embedding model may be trained to process images of surface features to create surface embedding data, while a second embedding model is trained to process images of subcutaneous features to create subcutaneous embedding data. The output embedding data may then be compared to previously stored embedding data to attempt to assert an identity.

However, such traditional systems exhibit correlation between the resulting output, decreasing overall accuracy. This correlation results from several causes, including some commonality of features between the modalities, traditional training techniques that tend to reinforce correlation, and so forth.

Decreased accuracy in biometric identification resulting from correlation is illustrated in the following example. Consider a first modality and a second modality are in use. A first trained traditional embedding model processes images acquired using the first modality. A second trained traditional embedding model processes images acquired using the second modality. Assume that each trained traditional embedding model has 99% accuracy, resulting in embedding data that would match an incorrect identity 1 out of 100 times. If these traditional models are 100% correlated, both will match to the same incorrect user. This results in 1 false positive identification out of 100 queries. However, if the correlation is reduced to 1%, the false positive identification would only occur in 1 out of 10,000 queries. Continuing the example, if correlation is zero, no false positive identifications would occur, because the embedding data from the two modalities would not match. As a result, decreasing correlation improves accuracy of biometric identification by reducing the likelihood of false positive identification.

ILLUSTRATIVE SYSTEM

FIG. 1 illustrates a system 100 to reduce data retention, according to some implementations. The system 100 is described as being used to facilitate the reduction of data retained as part of a biometric identification system that determines an identity of a user. However, the system and techniques described herein may be used in other situations.

A hand 102 of a user is depicted positioned above a scanner 104. The scanner 104 may include a computing device 106 and a camera 108. The camera 108 has a field of view (FOV) 110. During operation of the scanner 104, the camera 108 acquires images of an object in the FOV 110, such as the hand 102, and provides input image data 112. The scanner 104 may include other components which are not shown. For example, the scanner 104 may include lights that illuminate the object in the FOV 110.

In the implementation depicted, the hand 102 is held above the camera 108, with the FOV 110 extending upward. In other implementations, other configurations may be used. For example, the camera 108 may have the FOV 110 extending downwards, and the user may place their hand 102 in the FOV 110 under the scanner 104.

In one implementation, the scanner 104 is configured to acquire images of the hand 102 that are illuminated using infrared light that has two or more particular polarizations, with different illumination patterns, and so forth. For example, during operation the user may present their hand 102 with the palm or volar region of the hand toward the scanner 104. As a result, the input image data 112 provides an image of the anterior portion of the hand 102. In other implementations, the input image data 112 may include the back of the hand 102. Separate images may be acquired using different combinations of polarized light provided by the infrared lights.

Depending upon the polarization used, the images produced by the scanner 104 may be of first modality features or second modality features. The first modality may utilize images in which the hand 102 is illuminated with light having a first polarization and obtained by the camera 108 with a polarizer passing light to the camera 108 that also has the first polarization. First modality features may comprise features that are close to, or on, a surface of the hand 102 of the user. For example, the first modality features may include surface features such as creases, wrinkles, scars, dermal papillae ridges, and so forth in at least the epidermis of the hand 102. Images acquired using the first modality may be associated with one or more surface features.

Second modality features comprise those features that are below the epidermis. The second modality may utilize images in which the hand 102 is illuminated with light having a second polarization and obtained by the camera 108 with the polarizer passing light to the camera 108 with the first polarization. For example, the second modality features may include subcutaneous anatomical structures such as veins, bones, soft tissue, and so forth. Some features may be visible in both first modality and second modality images. For example, a crease in the palm may include first modality features on the surface as well as deeper second modality features within the palm. Images acquired using the second modality may be associated with one or more subcutaneous features.

Separate images of the first and second modalities may be acquired using different combinations of polarized light provided by infrared lights. In this illustration, the input image data 112 comprises first modality image data 114 and second modality image data 116. The first modality image data 114 and the second modality image data 116 of the same object may be acquired in rapid succession with respect to one another. For example, the camera 108 may operate at 60 frames per second and acquire the first modality image data 114 in a first frame and the second modality image data 116 in a second frame.

In the implementation depicted here, the scanner 104 does not include a guide, scan plate, or other structure that constrains the pose or position of the hand 102. The omission of the guide may improve sanitary operation of the system. For example, by removing the guide, the user's hand 102 does not come into physical contact with a structure, eliminating the possibility of contact transmission of contaminants, disease, and so forth. By removing the physical contact, the need for surface cleaning of the guide between users may be eliminated.

In another implementation, the scanner 104 may include a structure such as a guide or scan plate to constrain at least some movement of the hand 102. For example, the scan plate may comprise a flat pane of glass which the hand 102 may rest upon, and the camera 108 may then acquire an image.

Users are able to utilize the system 100 by performing an enrollment process. An enrollment module 118 may coordinate the enrollment process. Enrollment may associate biometric information, such as embedding data or transformed embedding data, with particular information such as a name, account number, and so forth.

During an enrollment process, the user opts in and presents their hand 102 to the scanner 104. The scanner 104 provides input image data 112 to a computing device 106 executing an embedding network module 120. The embedding network module 120 may comprise a neural network implementing a multimodal decorrelated embedding model 130 ("embedding model") that accepts as input the input image data 112 and provides as output embedding data 136. The embedding model 130 is discussed in more detail below. The embedding data 136 is representative of at least some of the features depicted in the input image data 112. In some implementations, the embedding data 136 may comprise a vector value in an embedding space.

In some implementations, the scanner 104 may include a computing device 106, and may execute the embedding network module(s) 120. In another implementation, the scanner 104 may encrypt and send the input image data 112 or data based thereon, to another computing device 106 such as a server.

During the enrollment process, the submitted embedding data 136 may be checked to determine whether the user has been previously enrolled. A successful enrollment may comprise storage of identification data 142, such as name, telephone number, account number, and so forth and storage of one or more of the embedding data 136 or the transformed embedding data as enrolled user data 140. In some implementations, the enrolled user data 140 may comprise additional information associated with processing of the input image data 112 with an embedding model 130. For example, the enrolled user data 140 may comprise intermediate layer data, such as the values of a penultimate layer of the embedding model 130.

In this illustration, at a first time the embedding model 130 is trained using training data 132 to determine trained model data 134. The training data 132 may comprise a plurality of first modality and second modality images that have been labeled. For example, label data may indicate the sample identifier, identity label, modality label, and so forth. The training data 132 is discussed in more detail with regard to FIG. 3.

The embedding model 130 comprises a machine learning network that includes a backbone, an intersection branch, and an XOR branch in a joint model training framework. The intersection branch facilitates learning to generate embedding data that is representative of features present in both modalities. The XOR branch facilitates learning to generate embedding data representing features that are distinct with the first modality, and the second modality. This is discussed in more detail with regard to FIG. 2.

During subsequent usage, such as at a second time, the (as yet unidentified) user presents their hand 102 at a scanner 104. The resulting query input image data 112 may be processed by the (now trained) embedding model 130 to determine query embedding data 162.

The comparison module 160 compares the query embedding data 162 to the embedding data 136 stored in the enrolled user data 140 to determine asserted identification data 164. In one implementation, the asserted identification data 164 may comprise a user identifier associated with the closest previously stored embedding data 136 in the enrolled user data 140 to the query embedding data 162 associated with the user who presented their hand 102. The comparison module 160 may utilize other considerations, such as requiring that the query embedding data 162 is no more than a maximum distance in the embedding space from the embedding data 136 of a particular user before determining the asserted identification data 164.

The asserted identification data 164 may then be used by subsequent systems or modules. For example, the asserted identification data 164, or information based thereon, may be provided to a facility management module 166.

The facility management module 166 may use the asserted identification data 164 to associate an identity with that user as they move about the facility. For example, the facility management module 166 may use data from cameras or other sensors in the environment to determine a location of the user. Given a known path of the user from an entrance that utilizes the scanner 104, the user identity indicated in the identification data 142 may be associated with the user as they use the facility. For example, the now identified user may walk to a shelf, remove an item, and leave the facility. The facility management module 166 may determine the interaction data indicative of the removal of the item as being associated with the user identifier specified in the asserted identification data 164, and bill an account associated with the user identifier. In another implementation, the facility management module 166 may comprise a point of sale system. The user may present their hand 102 at checkout to assert their identity and pay using a payment account that is associated with their identity.

The systems and techniques described above are discussed with respect to images of human hands. These systems and techniques may be used with respect to other forms of data, other kinds of objects, and so forth. For example, these techniques may be used for facial recognition systems, object recognition systems, and so forth.

Figure 2:
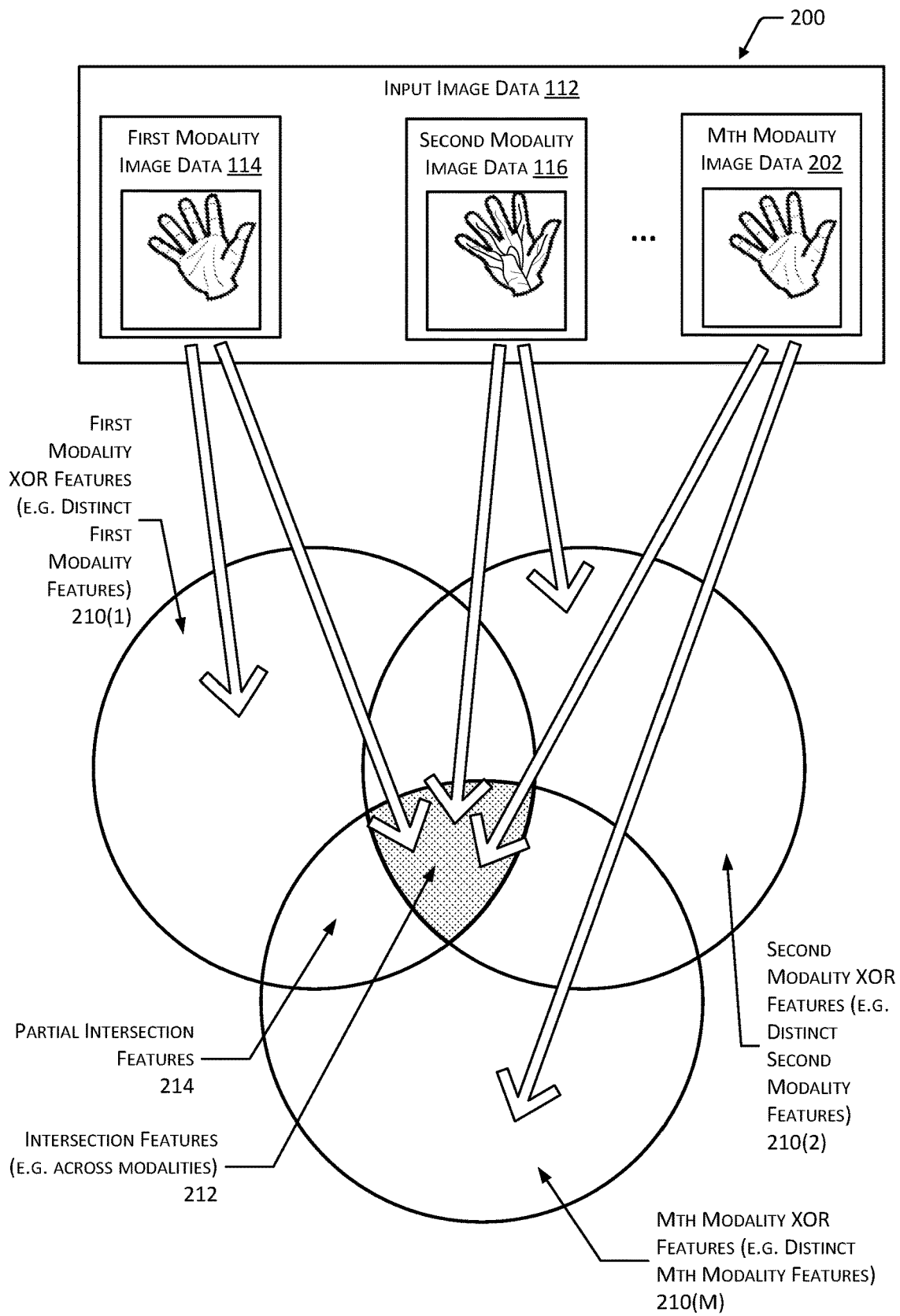
FIG. 2 is a diagram illustrating intersection features and XOR modality features for different modalities, according to some implementations.

FIG. 2 is a diagram 200 illustrating intersection features and XOR modality features for different modalities, according to some implementations. Input image data 112 is shown, comprising first modality image data 114, second modality image data 116, and Mth modality image data 202. This disclosure describes systems and techniques using two modalities by way of illustration, and not necessarily as a limitation. In some implementations, additional modalities may be used. For example, the Mth modality may be used that comprises a color visible light image such as produced by a red-green-blue (RGB) camera, a thermal image as produced by a thermal imaging camera, or other information.

Each image, acquired using a different modality, may contain features that are common across two or more modalities (an intersection), or distinct with respect to the other modalities (an exclusive "or", or "XOR"). In the following example, the first modality image data 114 depicts surface features of the hand 102 and the second modality image data 116 depicts subcutaneous features of the hand 102. Some examples, of features that are common across both modalities is the overall outline of the hand, deep creases in the palm and joints, and so forth. Features such as these would be represented in the overlap between modalities, shown as the intersection features 212. In comparison, a feature that appears in one modality but not in another may be considered distinct. The first modality XOR features 210(1) are those features that are distinct to the first modality. The second modality XOR features 210(2) are those features that are distinct to the second modality. Continuing the earlier example, the first modality XOR features 210(1) may include fine details such as friction ridges present on fingers and palm. In comparison, the second modality XOR features 210(2) may include vein patterns beneath the skin.

By training the multimodal decorrelated embedding model 130 as described herein, the system 100 is able to explicitly utilize information about the intersection features 212 as well as the XOR features 210 to determine the embedding data 136. Because the embedding model 130 is trained utilizing loss values relating to both the intersection and the XOR features, the system learns to decorrelate features that are common across modalities. Colloquially, it may be said that the system learns to extract features that are unique to a particular modality, while minimizing learning features that may be present across modalities and thus is highly correlated.

In some implementations, the system 100 may utilize information for partial intersection features 214. The partial intersection features 214 comprise those features represented in the overlap between two or more modalities, but less than all modalities. For example, a partial intersection feature 214 may comprise a feature that is represented in two modalities but not the third modality.

Figure 3:
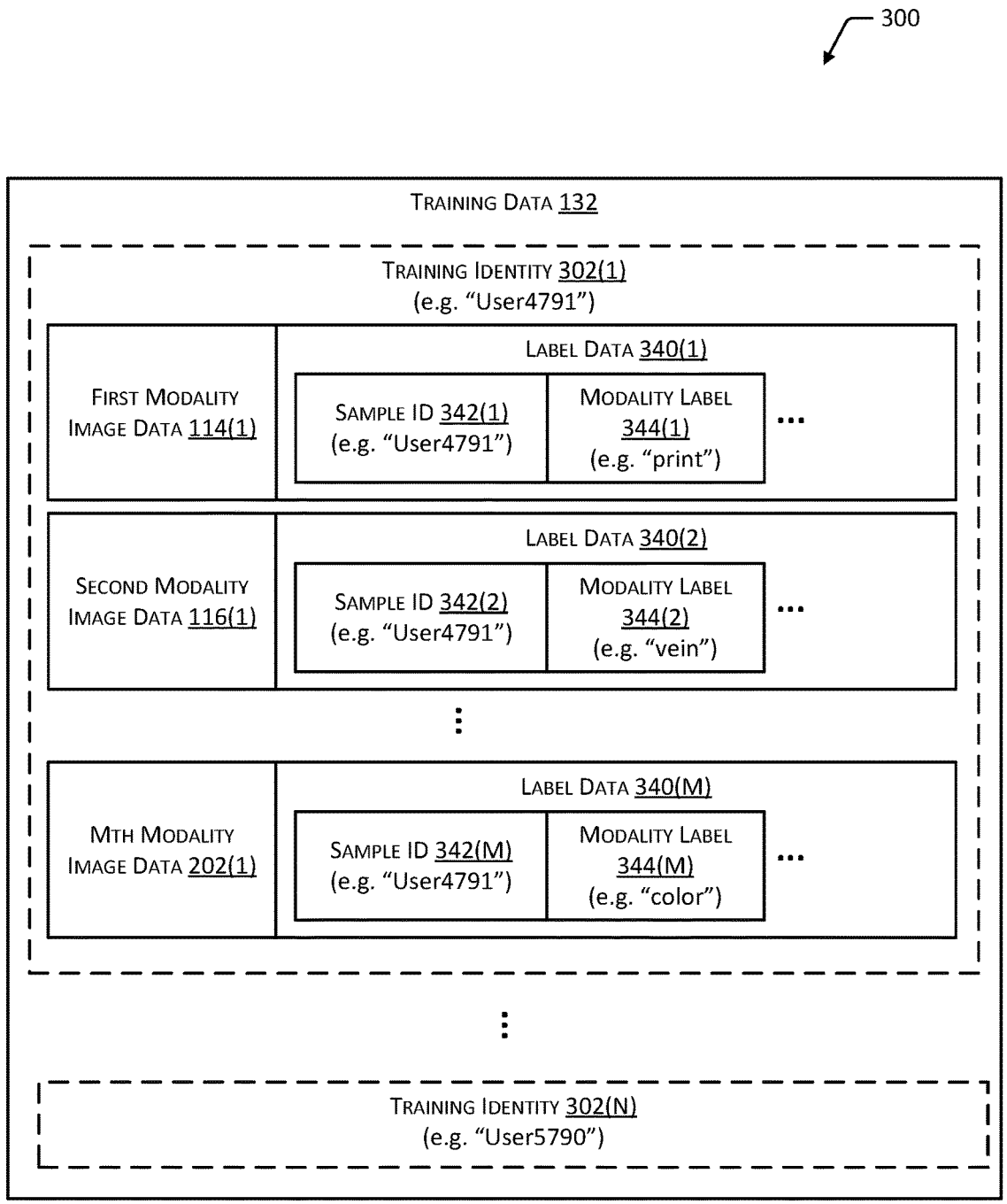
FIG. 3 illustrates training data that is labeled for training the multimodal decorrelated embedding model, according to some implementations.

FIG. 3 illustrates at 300 training data 132 that is labeled for training the multimodal decorrelated embedding model 130, according to some implementations. The training data 132 comprises a plurality of images that are representative of a plurality of training identities, 302(1), 302(2), . . . , 302(N). Each training identity 302 is considered to be unique with respect to the other training identities 302.

The information associated with each training identity 302 may comprise actual image data acquired from users who have opted in to provide information for training, synthetic input data that has been generated, or a combination thereof. In one implementation, the training data 132 may exclude individuals who have enrolled to use of the system for identification. For example, enrolled users having identification data 142 may be excluded from inclusion in the training data 132. In another implementation, some enrolled users may opt in to explicitly permit input image data 112 obtained during enrollment to be stored as training data 132.

The synthetic input data may comprise synthetic data that is consistent with expected input image data 112. For example, the synthetic input data may comprise output from a generative adversarial network (GAN) that has been trained to produce synthetic images of a user's hand. In some implementations, the synthetic input data may be based on actual input data. In other implementations, other techniques may be used to determine the synthetic input data.

Each training identity 302(1)-302(N) includes modality image data and associated label data 340. The label data 340 may comprise information such as a sample identifier (ID) 342, modality label 344, and so forth. The sample ID 342 indicates a particular training identity. The sample ID 342 may be used to distinguish one training identity 302 from another. In implementations where actual input data is used as part of the training data 132, the sample ID 342 may be assigned independently of the actual identification data 142 associated with that user. For example, the sample ID 342 may have a value of "User4791" and not the actual identity of "Bob Patel". The modality label 344 indicates whether the associated image data is representative of a first modality, second modality, and so forth.

In this illustration, each training identity 302(1)-302(N) includes first modality image data 114(1) and associated sample ID 342(1) and modality label 344(1), and second modality image data 116(1) and associated sample ID 342(2)

and modality label 344(2). In implementations where additional modalities are used, the training data 132 for a training identity 302 may also include Mth modality image data 202(1) and associated sample ID 342(M) and modality label 344(M).

Figure 4:
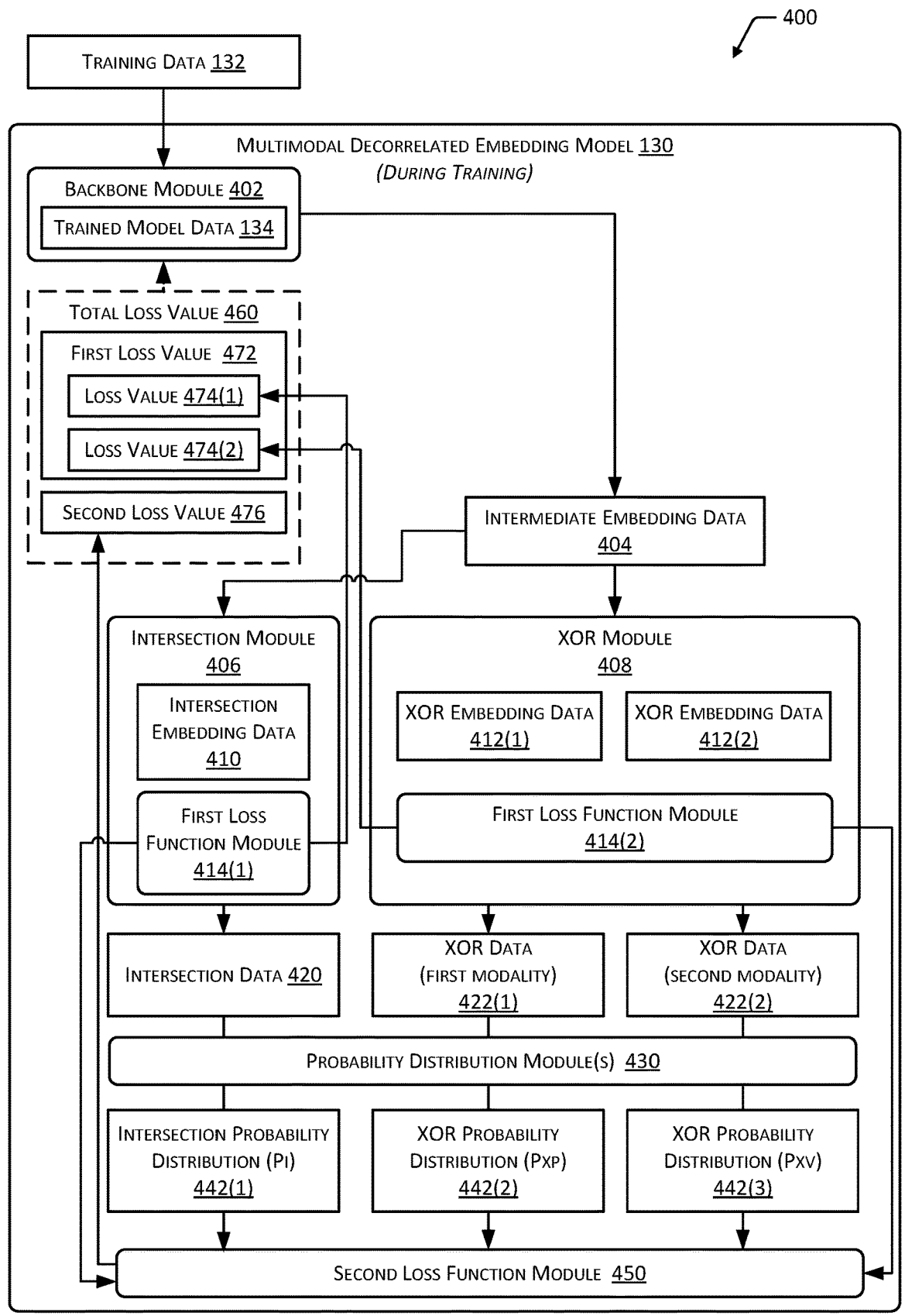
FIG. 4 illustrates a block diagram of the multimodal decorrelated embedding model during training, according to some implementations.

FIG. 4 illustrates a block diagram 400 of the multimodal decorrelated embedding model 130 during training, according to some implementations. A machine learning network is used to implement the embedding model 130. The machine learning network may comprise a backbone module 402 comprising a backbone architecture of an artificial neural network. The backbone module 402 accepts as input the training data 132 and produces intermediate embedding data 404.

In one implementation the backbone module 402 may utilize a neural network having at least one layer utilizing an inverted residual with a linear bottleneck. For example, MobileNetV2 implements this architecture. (See "MobileNetV2: Inverted Residuals and Linear Bottlenecks", Sandler, M. et al, 2018 IEEE/CVF Conference on Computer Vision and Pattern Recognition, 18-23 Jun. 2018.)

The embedding model 130 includes an intersection branch as implemented by an intersection module 406 and an XOR branch as implemented by an XOR module 408 to provide a joint model training framework. During training, the intersection module 406 and the XOR module 408 utilize respective first loss function modules 414(1) and 414(2) to determine loss values 474. The branches utilize the label data 340 during training. The loss values 474 may also be provided to the second loss function module 450.

The intersection branch, as implemented by the intersection module 406, processes the intermediate embedding data 404 to determine intersection embedding data 410 and a first loss value 474(1). For example, the intersection branch is trained such that first modality and second modality images having the same sample ID 342 value belong to the same class. As a result, after training, the intersection embedding data 410 is representative of features depicted in a first modality image and a second modality image that are labeled as having a same identity.

The XOR branch, as implemented by the XOR module 408, processes the intermediate embedding data 404 to determine XOR embedding data 412 for each modality being trained. Each modality of a sample ID 342 may be assigned a different class label for training on the XOR branch. The XOR module 408 is trained such that first modality and second modality images with the same sample ID 342 value belong to different classes. As a result, after training, the XOR embedding data 412 is representative of features that are depicted in a particular modality and not in the other modalities.

In the implementation shown, there are two modalities in use, resulting in first XOR embedding data 412(1) associated with the first modality and second XOR embedding data 412(2) associated with the second modality. For example, during training, when the intermediate embedding data 404 is associated with an input image having a modality label 344 indicating the first modality, the XOR branch determines the first modality XOR embedding data 412(1). Continuing the example, when the intermediate embedding data 404 is associated with an input image having a modality label 344 indicating the second modality, the XOR branch determines the second modality XOR embedding data 412(2).

In one implementation, the first loss function module 414 may utilize a hyperspherical loss function as shown with regard to equations 1 and 2. In other implementations, other loss functions may be used. For example, other functions such as Softmax, Cosine, AM-Softmax, Arcface, large margin cosine loss, and so forth may be used.

The hyperspherical loss (HSL) function minimizes L which is the sum of a cross-entropy term, and a regularization term to regularize the confidence score (weighted by $\lambda$). $W_j$ denotes a classifier weight for $j^{th}$ class. C is the total number of training classes. M is the minibatch size. In these equations m is a fixed angular margin. $\hat{W}$ and $\hat{x}$ are the unit-normalized form of W and x respectively. Also in these equations, $x_i$ (embedding vector of input i) and $s_i$ are both outputs of the respective modules such as the intersection module 406 and the XOR module 408, where $s_i$ is used only during training.

$$L = -\frac{1}{M}\sum_{i=1}^{M}(\log p_i - \lambda s_i^2) \qquad (1)$$

$$p_i = \frac{e^{S_i(\hat{w}_{y_i}^T \hat{x}_i - m)}}{e^{S_i(\hat{w}_{y_i}^T \hat{x}_i - m)} + \sum_{j=1, j \neq y_i}^{C} e^{\hat{w}_j^T \hat{x}_i}} \qquad (2)$$

During training, intersection data 420 is determined by the intersection module 406. The intersection data 420 may comprise, or be based on, the intersection embedding data 410, one or more parameters of the intersection embedding data 410, and so forth. For example, the one or more parameters may comprise weights for one or more classes. Also during training, a plurality of the first modality XOR embedding data 412(1) and the second modality XOR embedding data 412(2) or data based thereon may be stored as first XOR data 422(1) and second XOR data 422(2). The XOR data 422 may comprise, or be based on, the respective XOR embedding data 412, one or more parameters of the XOR embedding data 412, and so forth. Once training is complete, the intersection data 420, XOR data 422 may be deleted or otherwise discarded.

A probability distribution module 430 processes the data 420-422 to determine a set of probability distributions. The intersection data 420 is processed to determine an intersection probability distribution (Pi) 442(1). The first modality XOR data 422(1) is processed to determine a first modality XOR probability distribution (Pxp) 442(2). The second modality XOR data 422(2) is processed to determine a second modality XOR probability distribution (Pxv) 442(3).

A second loss function module 450 accepts the probability distributions 442 and determines a second loss value 476. In one implementation, the second loss function module 450 may implement a Jensen-Shannon Divergence (JSD) loss function. The JSD loss function measures similarity between two probability distributions. For two probability distributions P and Q JSD may be defined in one implementation with the following equation:

$$JSD(P\|Q) = 0.5*(D)P\|M) + D(Q\|M)) \qquad (3)$$

where M=(P+Q)/2, D is the Kullback-Leibler Divergence (KLD)

Unlike KLD, JSD(P∥Q)=JSD(Q∥P), which allows JSD to be used as a distance metric for probability distributions. It is desired that the values of the probability distributions 442 of incorrect classes for the intersection (I), first modality XOR (Xp) and the second modality XOR (Xv) have values that differ from one another, implicitly ensuring decorrelation.

Given an image x for identity c, the joint model training framework described above and using a first loss function such as hyperspherical loss, determines the set of probability distributions 442: the intersection probability distribution (Pi) 442(1), the first modality XOR probability distribution (Pxp) 442(2), and the second modality XOR probability distribution (Pxv) 442(3). For example, the loss values 474 determined by the first loss function module(s) 414 may be used as input to the JSD loss function. These probability distributions are N dimensional, where N is the number of training identities 302(N). This can be expressed with the following equations:

$$Pi = [pi\_1, pi\_2, \ldots, pi\_N] \quad (4)$$

$$Pxp = [pxp\_1, pxp\_2, \ldots, pxp\_N] \quad (5)$$

$$Pxv = [pxv\_1, pxv\_2, \ldots, pxv\_N] \quad (6)$$

From each of these probability distributions 442, the entry corresponding to the correct identity c is removed, and the vector is normalized to get (N-1) dimensional probability distribution of incorrect classes $Pi\_n$, $Pxp\_n$, $Pxv\_n$ as shown in the following equations:

$$Pi\_n = [pi\_1, pi\_2, \ldots, pi\_{c-1}, pi\_{c+1}, \ldots, pi\_N]/(1-pi\_c) \quad (7)$$

$$Pxp\_n = [pxp\_1, pxp\_2, \ldots, pxp\_{c-1}, pxp\_{c+1}, \ldots pxp\_N]/(1-pxp\_c) \quad (8)$$

$$Pxv\_n = [pxv\_1, pxv\_2, \ldots, pxv\_{c-1}, pxv\_{c+1}, \ldots, pxv\_1 \backslash 1]/(1-pxv\_c) \quad (9)$$

The JSD loss then minimizes the following equation:

$$JSD\_Loss = -1.0 * (JSD(Pi\_n \| Pxp\_n) + JSD(Pi\_n \| Pxv\_n) + JSD(Pxp\_n \| Pxv\_n)) \quad (10)$$

A total loss value 460 is calculated based on the first loss values 472 and the second loss value 476. For example, the total loss value 460 may be calculated using the following equation:

$$Total\_Loss = Hyperspherical\_loss + loss\_weight * JSD\_loss \quad (11)$$

The total loss value 460 may then be provided to the backbone module 402 for subsequent iterations during training. As a result of training, the trained model data 134 is determined. For example, the trained model data 134 may comprise weight values, bias values, threshold values, and so forth that are associated with particular nodes or functions within the embedding model 130. Once trained, the embedding model 130 may be used to determine embedding data 136 for subsequent use.

Subsequent use may include using the embedding model 130 to enroll a user. At a first time, the enrollment module 118 is used to acquire input image data 112(1) for a user "Alex". This input image data 112(1) is processed by the (trained) embedding model 130 to determine embedding data 136(1) representative of Alex in an embedding space. This embedding data 136(1) may be stored in the enrolled user data 140 and associated with identification data 142, such as an account number, name, and so forth.

The embedding model 130 may be used to determine asserted identification data 164. For example, query input image data 112(Q) may be processed by the (trained) embedding model 130 to determine query embedding data 162. The comparison module 160 compares the query embedding data 162 to the embedding data 136 stored in the enrolled user data 140 to determine asserted identification data 164. In one implementation, the asserted identification data 164 may comprise a user identifier associated with the closest previously stored embedding data 136 in the enrolled user data 140 to the query embedding data 162 associated with the user who presented their hand 102. The comparison module 160 may utilize other considerations, such as requiring that the query embedding data 162 is no more than a maximum distance in the embedding space from the embedding data 136 of a particular user before determining the asserted identification data 164.

Once trained, a deployed implementation of the embedding model 130 may omit one or more modules that are used during training and not during inference. For example, the embedding model 130 may omit the probability distribution module 430, the second loss function module 450, and so forth. In some implementations, the embedding model 130 as used during inference may comprise the backbone module 402 and trained model data 134, and omit one or more of the intersection module 406 or the XOR module 408.

Figure 5:
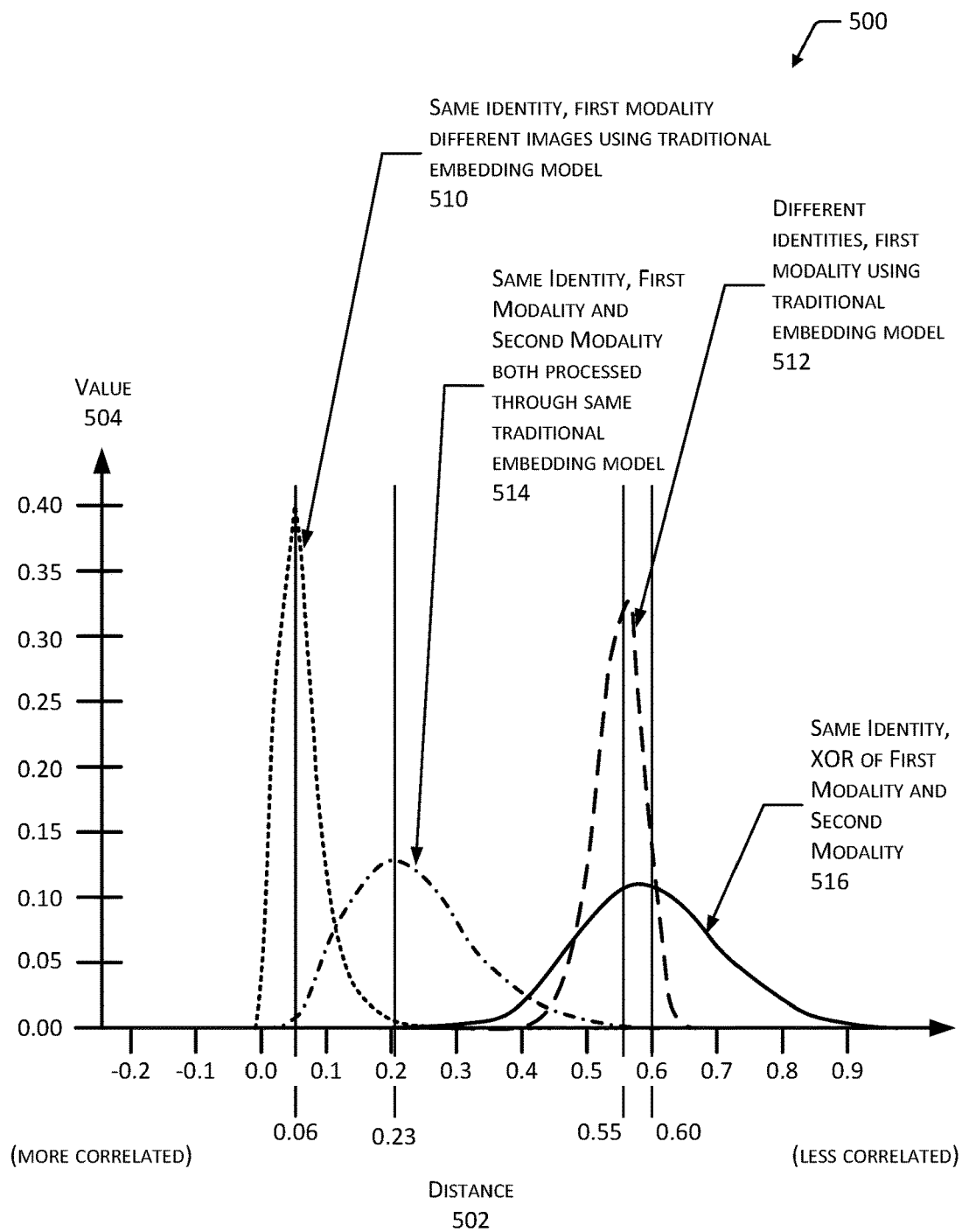
FIG. 5 is a graph illustrating test results comparing a traditional embedding model to the multimodal decorrelated embedding model, according to some implementations.

FIG. 5 is a graph 500 illustrating test results comparing a traditional embedding model to the multimodal decorrelated embedding model 130, according to some implementations.

In this graph 500 a horizontal axis is indicative of a distance 502 between the specified pairs of embedding data 136 represented by each curve. A vertical axis is indicative of a value 504 such as a probability.

A curve 510 is shown that illustrates the values 504 at various distances 502 between embedding data 136 resulting from processing different input images in the first modality that are associated with the same identity with the same traditional embedding model. For example, the traditional embedding model may have been trained to process first modality images or second modality images. With this configuration, a first peak is shown at a distance 502 of 0.06, indicating that while using the traditional embedding model, the distance 502 is close between the embedding vectors of two different input images of the same hand in the same modality. This is consistent with expectations, as a biometric identification system ideally will provide embedding data 136 that is consistent for the same person, allowing a person to be accurately identified at a later time.

In comparison, curve 512 is shown that illustrates the values 504 at various distances 502 between embedding data 136 resulting from processing input images of the first modality that are associated with different identities using the traditional embedding model. With this configuration, a second peak is shown at a distance 502 of 0.60, indicating that while using the traditional embedding model, the distance 502 is large between the embedding vectors of two different identities in the same modality. This is consistent with expectations, as a biometric identification system ideally will provide embedding data 136 that is different for different identities, allowing a person to be accurately distinguished from others.

As mentioned above, traditional embedding models may experience correlation between the different modalities. This is illustrated with curve 514. Curve 514 results from processing input images of the different modalities through a single traditional embedding model. For example, assume the traditional system uses a first embedding model for surface features shown in a first modality and a second embedding model for subcutaneous features shown in a second modality. The curve 514 illustrates the distance 502 between the embedding vectors resulting from processing the first modality image data 114 and the second modality image data 116 for the same person, using only the first embedding model. This results in a third peak at a distance 502 of 0.23. This third peak indicates that the embedding data produced by the first embedding model is highly correlated to the embedding data produced by the second embedding model in this example. Said another way, both embedding models in this example appear to be utilizing features that are common to both modalities. Ideally, the decorrelation between the modalities would result in the peak of curve 514 coinciding with the curve 512 relating to different identities.

In comparison, the curve 516 illustrates the distance 502 between the embedding vectors resulting from processing the first modality image data 114 and the second modality image data 116 for the same person, using the embedding model 130 described herein. This results in a fourth peak at a distance 502 of 0.6. This shows a substantial improvement compared to the curve 514, exceeding the decorrelation shown by curve 512 involving different identities. Said another way, by using the embedding model 130 in this disclosure, the resulting embedding data 136 experiences significant decorrelation between the modalities used. Such decorrelation results in a reduction of false positives, and improves system resistance against the presentation of artifacts such as facial masks, simulated hands, and so forth.

Figure 6:
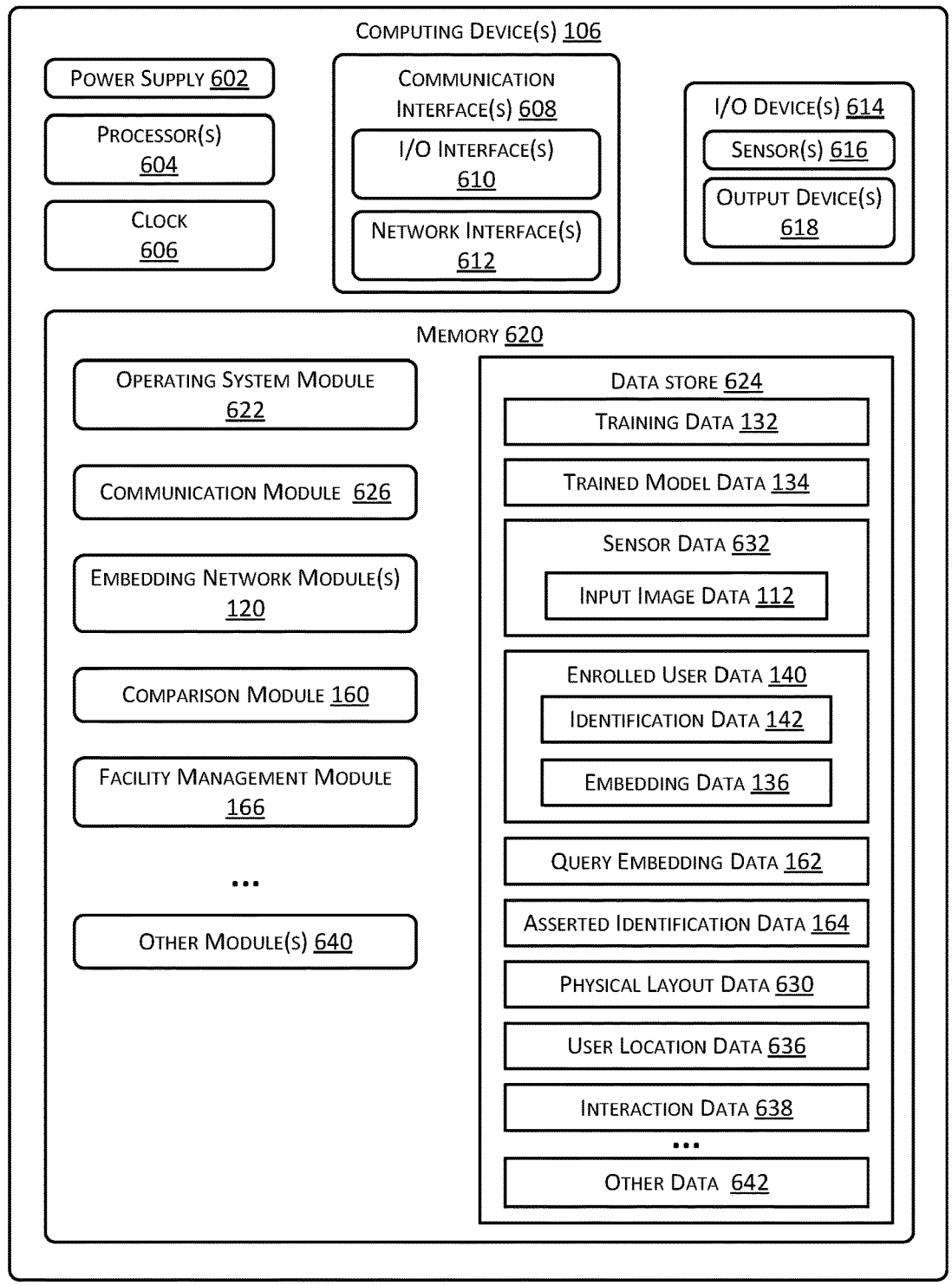
FIG. 6 is a block diagram of a computing device to implement the system, according to some implementations.

FIG. 6 is a block diagram 600 of a computing device 106 to implement the system 100, according to some implementations. The computing device 106 may be within the scanner 104, may comprise a server, and so forth. The computing device 106 may be physically present at the facility, may be accessible by a network, or a combination of both. The computing device 106 does not require end-user knowledge of the physical location and configuration of the system that delivers the services. Common expressions associated with the computing device 106 may include "embedded system", "on-demand computing", "software as a service (SaaS)", "platform computing", "network-accessible platform", "cloud services", "data centers", and so forth. Services provided by the computing device 106 may be distributed across one or more physical or virtual devices.

One or more power supplies 602 may be configured to provide electrical power suitable for operating the components in the computing device 106. The one or more power supplies 602 may comprise batteries, capacitors, fuel cells, photovoltaic cells, wireless power receivers, conductive couplings suitable for attachment to a power source such as provided by an electric utility, and so forth. The computing device 106 may include one or more hardware processors 604 (processors) configured to execute one or more stored instructions. The processors 604 may comprise one or more cores. One or more clocks 606 may provide information indicative of date, time, ticks, and so forth. For example, the processor 604 may use data from the clock 606 to associate a particular interaction with a particular point in time.

The computing device 106 may include one or more communication interfaces 608 such as input/output (I/O) interfaces 610, network interfaces 612, and so forth. The communication interfaces 608 enable the computing device 106, or components thereof, to communicate with other devices or components. The communication interfaces 608 may include one or more I/O interfaces 610. The I/O interfaces 610 may comprise Inter-Integrated Circuit (I2C), Serial Peripheral Interface bus (SPI), Universal Serial Bus (USB) as promulgated by the USB Implementers Forum, RS-232, and so forth.

The I/O interface(s) 610 may couple to one or more I/O devices 614. The I/O devices 614 may include input devices such as one or more of a sensor 616, keyboard, mouse, scanner, and so forth. The I/O devices 614 may also include output devices 618 such as one or more of a display device, printer, audio speakers, and so forth. In some embodiments, the I/O devices 614 may be physically incorporated with the computing device 106 or may be externally placed. The sensors 616 may comprise the camera 108, smartcard readers, touch sensors, microphones, and so forth.

The network interfaces 612 may be configured to provide communications between the computing device 106 and other devices, such as routers, access points, and so forth. The network interfaces 612 may include devices configured to couple to personal area networks (PANS), local area networks (LANs), wireless local area networks (WLANS), wide area networks (WANs), and so forth. For example, the network interfaces 612 may include devices compatible with Ethernet, Wi-Fi, Bluetooth, and so forth.

The computing device 106 may also include one or more buses or other internal communications hardware or software that allow for the transfer of data between the various modules and components of the computing device 106.

As shown in FIG. 6, the computing device 106 includes one or more memories 620. The memory 620 may comprise one or more non-transitory computer-readable storage media (CRSM). The CRSM may be any one or more of an electronic storage medium, a magnetic storage medium, an optical storage medium, a quantum storage medium, a mechanical computer storage medium, and so forth. The memory 620 provides storage of computer-readable instructions, data structures, program modules, and other data for the operation of the computing device 106. A few example functional modules are shown stored in the memory 620, although the same functionality may alternatively be implemented in hardware, firmware, or as a system on a chip (SoC).

The memory 620 may include at least one operating system (OS) module 622. The OS module 622 is configured to manage hardware resource devices such as the I/O interfaces 610, the I/O devices 614, the communication interfaces 608, and provide various services to applications or modules executing on the processors 604. The OS module 622 may implement a variant of the FreeBSD operating system as promulgated by the FreeBSD Project; other UNIX or UNIX-like variants; a variation of the Linux operating system as promulgated by Linus Torvalds; the Windows operating system from Microsoft Corporation of Redmond, Wash., USA; and so forth.

A communication module 626 may be configured to establish communications with the computing device 106, servers, other computing devices 106, or other devices. The communications may be authenticated, encrypted, and so forth.

Also stored in the memory 620 may be a data store 624 and one or more of the following modules. These modules may be executed as foreground applications, background tasks, daemons, and so forth. The data store 624 may use a flat file, database, linked list, tree, executable code, script, or other data structure to store information. In some implementations, the data store 624 or a portion of the data store 624 may be distributed across one or more other devices including other computing devices 106, network attached storage devices, and so forth.

The data store 624 may store one or more of the training data 132, the trained model data 134, enrolled user data 140, query embedding data 162, and so forth. The memory 620 may store the embedding network module(s) 120, the comparison module 160, the facility management module 166, and so forth.

In some implementations, the input image data 112 may be temporarily stored during processing by the embedding network module 120. For example, the scanner 104 may acquire the input image data 112, determine embedding data 136 based on the input image data 112, and then erase the input image data 112. The resulting embedding data 136 may then be sent to a server or other computing device 106 to perform enrollment, for comparison to assert an identity, and so forth.

The facility management module 166 may perform various functions, such as tracking items between different inventory locations, to and from carts, generating restocking orders, directing operation of robots within the facility, using the asserted identification data 164 to associate a particular user identity with a user in the facility, and so forth. During operation, the facility management module 166 may access sensor data 632 such as input image data 112, or data from other sensors 616.

Information used by the facility management module 166 may be stored in the data store 624. For example, the data store 624 may be used to store physical layout data 630, sensor data 632, asserted identification data 164, user location data 636, interaction data 638, and so forth. For example, the sensor data 632 may comprise the input image data 112 obtained from a scanner 104 associated with the facility.

The physical layout data 630 may provide information indicative of where scanners 104, cameras, weight sensors, antennas for radio receivers, inventory locations, and so forth are in the facility with respect to one another. For example, the physical layout data 630 may comprise information representative of a map or floor plan of the facility with relative positions of gates with scanners 104 and inventory locations.

The facility management module 166 may generate the user location data 636 that is indicative of the location of the user within the facility. For example, the facility management module 166 may use image data obtained by the cameras to determine a location of the user. In other implementations, other techniques may be used for determining the user location data 636. For example, data from a smart floor may be used to determine the location of the user.

The identification data 142 may be associated with user location data 636. For example, the user enters the facility and has their hand 102 scanned by the scanner 104, resulting in asserted identification data 164 that is associated with their time of entry and the scanner 104 location. The user location data 636 indicative of a path of a user that begins at the scanner 104 location at the time of entry may be associated with the user identifier in the asserted identification data 164.

Based on the user location data 636 and the interaction data 638, a particular interaction may be associated with an account of a particular user. For example, if the user location data 636 indicates that the user is present in front of inventory location 692 at time 09:02:02 and the interaction data 638 indicates a pick of a quantity of one item from an area on inventory location 692 at 09:04:13, the user may be billed for that pick.

The facility management module 166 may use the sensor data 632 to generate the interaction data 638. The interaction data 638 may include information about the type of item involved, quantity involved, whether the interaction was a pick or place, and so forth. Interactions may include the user picking an item from an inventory location, placing an item at the inventory location, touching an item at the inventory location, rummaging through items at the inventory location, and so forth. For example, the facility management module 166 may generate interaction data 638 that indicates what item the user picked from a particular lane on a shelf, and then use this interaction data 638 to adjust the count of inventory stowed at that lane. The interaction data 638 may then be used to bill an account associated with the user identifier that is associated with the user who picked the item.

The facility management module 166 may process the sensor data 632 and generate output data. For example, based on the interaction data 638, a quantity of a type of item at a particular inventory location may drop below a threshold restocking level. The system may generate output data comprising a restocking order indicative of the inventory location, the area, and a quantity needed to replenish stock to a predetermined level. The restocking order may then be used to direct a robot to restock that inventory location.

Other modules 640 may also be present in the memory 620 as well as other data 642 in the data store 624. For example, a billing module may use the interaction data 638 and the asserted identification data 164 to bill an account associated with a particular user.

The devices and techniques described in this disclosure may be used in a variety of other settings. For example, the system 100 may be used in conjunction with a point-of-sale (POS) device. The user may present their hand 102 to a scanner 104 to provide an indication of intent and authorization to pay with an account associated with the asserted identification data 164. In another example, a robot may incorporate a scanner 104. The robot may use the asserted identification data 164 to determine whether to deliver a parcel to the user, and based on the asserted identification data 164, which parcel to deliver.

While the input to the system 100 is discussed with respect to image data, the system may be used with other types of input. For example, the input may comprise data acquired from one or more sensors 618, data generated by another system, and so forth. For example, instead of image data produced by the camera 108, the input to the system 100 may comprise an array of data. Other modalities may also be used. For example, the first modality may be visible light, the second modality may be sonar, and so forth.

While the system 100 is discussed with respect to processing biometric data, the system may be used with other types of data. For example, the input may comprise satellite weather imagery, seismic data, product images, data indicative of chemical composition, and so forth. For example, instead of image data produced by the camera 108, the input to the system 100 may comprise an array of data.

The processes discussed herein may be implemented in hardware, software, or a combination thereof. In the context of software, the described operations represent computer-executable instructions stored on one or more non-transitory computer-readable storage media that, when executed by one or more processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, optical disks, read-only memories (ROMs), random access memories (RAMS), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as illustrative forms of implementing the claims.

What is claimed is:

1. A system comprising:
   a memory, storing first computer-executable instructions; and
   a hardware processor to execute the first computer-executable instructions to:
   determine training data comprising:
      a first modality image,
      a first identity label that is associated with the first modality image and is indicative of a first identity,
      a first modality label indicative of a first modality that is associated with the first modality image,
      a second modality image,
      a second identity label that is associated with the second modality image and is indicative of the first identity, and
      a second modality label indicative of a second modality that is associated with the second modality image;
   determine, using a first portion of a machine learning network to process the first modality image and the second modality image, first intermediate embedding data;
   determine, using a second portion of the machine learning network to process the first modality image and the second modality image, intersection embedding data and a first loss value, wherein the intersection embedding data is representative of features depicted in the first modality image and the second modality image;
   determine, using a third portion of the machine learning network to process the first modality image and the second modality image:
      first modality XOR embedding data and an associated second loss value, wherein the first modality XOR embedding data is associated with features in the first modality image and not in the second modality image, and
      second modality XOR embedding data and an associated third loss value, wherein the second modality XOR embedding data is associated with features in the second modality image and not in the first modality image;
   determine, based on a plurality of intersection embedding data, an intersection probability distribution;
   determine, based on a plurality of the first modality XOR embedding data, a first XOR probability distribution;
   determine, based on a plurality of the second modality XOR embedding data, a second XOR probability distribution;
   determine, based on the intersection probability distribution, the first XOR probability distribution, and the second XOR probability distribution, a fourth loss value;
   determine a total loss value based on the first loss value, the second loss value, the third loss value, and the fourth loss value; and
   determine trained model data based on the total loss value.

2. The system of claim 1, wherein the first loss value, the second loss value, and the third loss value are determined using a hyperspherical loss function.

3. The system of claim 1, wherein the fourth loss value is determined using a Jensen-Shannon Divergence loss function.

4. The system of claim 1, wherein:
   the intersection probability distribution is indicative of a probability distribution of incorrect classes associated with the intersection embedding data;
   the first XOR probability distribution is indicative of a probability distribution of incorrect classes associated with the first modality XOR embedding data; and
   the second XOR probability distribution is indicative of a probability distribution of incorrect classes associated with the second modality XOR embedding data.

5. The system of claim 1, wherein:
   the first modality image comprises a first image of a first palm acquired using a first modality, and
   the second modality image comprises a second image of the first palm acquired using a second modality.

6. The system of claim 1, the hardware processor to execute the first computer-executable instructions to:
   determine query input image data comprising:
      a third image acquired using the first modality, and
      a fourth image acquired using the second modality;
   determine query embedding data based on processing the query input image data with the machine learning network using the trained model data; and
   determine, based on the query embedding data and previously stored embedding data, first identification data that is associated with the query input image data.

7. A computer-implemented method comprising:
   accessing training data comprising:

a first plurality of first modality images, and
a second plurality of second modality images;
determining, using a first portion of a machine learning network to process at least a portion of the training data, first intermediate embedding data;
determining, using a second portion of the machine learning network to process the at least a portion of the training data, intersection embedding data and a first loss value, wherein the intersection embedding data is representative of features depicted in a first modality image and a second modality image that are labeled as having a same identity;
determining, using a third portion of the machine learning network to process the at least a portion of the training data:
first modality XOR embedding data and an associated second loss value, wherein the first modality XOR embedding data is associated with features in the first modality image and not in the second modality image, and
second modality XOR embedding data and an associated third loss value, wherein the second modality XOR embedding data is associated with features in the second modality image and not in the first modality image;
determining, based on the intersection embedding data, the first modality XOR embedding data, and the second modality XOR embedding data, a first set of probability distributions;
determining, based on the first set of probability distributions, a fourth loss value;
determining a total loss value based on the first loss value, the second loss value, the third loss value, and the fourth loss value; and
determining trained model data based on the total loss value.

8. The method of claim 7, wherein the first portion comprises a neural network having at least one layer utilizing an inverted residual with a linear bottleneck.

9. The method of claim 7, wherein the first loss value, the second loss value, and the third loss value are determined using a hyperspherical loss function.

10. The method of claim 7, the determining the first set of probability distributions comprising:
determine, based on a plurality of intersection embedding data, an intersection probability distribution;
determine, based on a plurality of the first modality XOR embedding data, a first XOR probability distribution;
determine, based on a plurality of the second modality XOR embedding data, a second XOR probability distribution; and
determine, based on the intersection probability distribution, the first XOR probability distribution, and the second XOR probability distribution, the fourth loss value.

11. The method of claim 7, wherein the fourth loss value is determined using a Jensen-Shannon Divergence loss function.

12. The method of claim 7, wherein:
the first plurality of first modality images comprises a first image of at least a portion of a user that is acquired using a first modality, and
the second plurality of second modality images comprises a second image of the at least a portion of the user that is acquired using a second modality.

13. The method of claim 7, further comprising:
determining query input image data comprising:
a third image acquired using a first modality, and
a fourth image acquired using a second modality;
determining query embedding data based on processing the query input image data with the machine learning network using the trained model data; and
determining, based on the query embedding data and previously stored embedding data, first identification data that is associated with the query input image data.

14. A system comprising:
a memory, storing first computer-executable instructions; and
a hardware processor to execute the first computer-executable instructions to:
determine training data comprising:
a first plurality of labeled first modality images, and
a second plurality of labeled second modality images;
determine, using a first portion of a machine learning network to process the first plurality of labeled first modality images and the second plurality of labeled second modality images, first intermediate embedding data;
determine, using a second portion of the machine learning network to process the first plurality of labeled first modality images and the second plurality of labeled second modality images, intersection embedding data and a first loss value, wherein the intersection embedding data is representative of features depicted in a first modality image and a second modality image that are labeled as having a same identity;
determine, using a third portion of the machine learning network to process the first plurality of labeled first modality images and the second plurality of labeled second modality images:
first modality XOR embedding data and an associated second loss value, wherein the first modality XOR embedding data is associated with features in the first modality image and not in the second modality image, and
second modality XOR embedding data and an associated third loss value, wherein the second modality XOR embedding data is associated with features in the second modality image and not in the first modality image;
determine, based on the intersection embedding data, the first modality XOR embedding data, and the second modality XOR embedding data, a first set of probability distributions;
determine, based on the first set of probability distributions, a fourth loss value;
determine a total loss value based on the first loss value, the second loss value, the third loss value, and the fourth loss value; and
determine trained model data based on the total loss value.

15. The system of claim 14, wherein the first portion comprises a neural network having at least one layer utilizing an inverted residual with a linear bottleneck.

16. The system of claim 14, wherein the first loss value, the second loss value, and the third loss value are determined using a hyperspherical loss function.

17. The system of claim 14, wherein the instructions to determine the first set of probability distributions comprise instructions to:
determine, based on a plurality of intersection embedding data, an intersection probability distribution;

determine, based on a plurality of the first modality XOR embedding data, a first XOR probability distribution;

determine, based on a plurality of the second modality XOR embedding data, a second XOR probability distribution; and determine, based on the intersection probability distribution, the first XOR probability distribution, and the second XOR probability distribution, the fourth loss value.

18. The system of claim 14, wherein the fourth loss value is determined using a Jensen-Shannon Divergence loss function.

19. The system of claim 14, wherein:

the first modality image comprises a first image of a first palm acquired using a first modality, and the second modality image comprises a second image of the first palm acquired using a second modality.

20. The system of claim 14, the hardware processor to execute the first computer-executable instructions to:

determine query input image data comprising:

a third image acquired using a first modality, and a fourth image acquired using a second modality;

determine query embedding data based on processing the query input image data with the machine learning network using the trained model data; and determine, based on the query embedding data and previously stored embedding data, first identification data that is associated with the query input image data.

* * * * *